(12) United States Patent
Noll et al.

(10) Patent No.: US 6,606,961 B1
(45) Date of Patent: Aug. 19, 2003

(54) POINTER INSTRUMENT

(75) Inventors: Heinrich Noll, Gross-Umstadt (DE); Frank Jansa, Frankfurt (DE); Helmut Olbrich, Darmstadt (DE); Michael Vogel, Frankfurt (DE)

(73) Assignee: Mannesmann VDO AG, Frankfurt (DE)

( * ) Notice: Subject to any disclaimer, the term of this patent is extended or adjusted under 35 U.S.C. 154(b) by 0 days.

(21) Appl. No.: 09/623,694
(22) PCT Filed: Feb. 25, 1999
(86) PCT No.: PCT/EP99/01207
§ 371 (c)(1),
(2), (4) Date: Nov. 24, 2000
(87) PCT Pub. No.: WO99/47376
PCT Pub. Date: Sep. 23, 1999

(30) Foreign Application Priority Data

Mar. 13, 1998  (DE) .......................... 198 10 854

(51) Int. Cl.$^7$ .................. G01D 11/28; G01D 13/00
(52) U.S. Cl. .................. 116/288; 116/284; 116/303
(58) Field of Search .................. 116/284, 286, 116/287, 288, 303; 362/26, 27, 32

(56) References Cited

U.S. PATENT DOCUMENTS

| | | | | |
|---|---|---|---|---|
| 2,900,949 A | * | 8/1959 | Baker | 116/288 |
| 5,372,087 A | * | 12/1994 | Kato et al. | 116/288 |
| 5,636,589 A | | 6/1997 | Kato et al. | |
| 5,747,743 A | * | 5/1998 | Kato et al. | 174/254 |
| 6,082,288 A | * | 7/2000 | Kato et al. | 116/288 |

FOREIGN PATENT DOCUMENTS

| | | |
|---|---|---|
| DE | 2151987 | 5/1973 |
| DE | 3837295 | 5/1990 |
| DE | 4341783 | 6/1995 |
| DE | 19537346 | 4/1996 |
| DE | 19534020 | 3/1997 |
| DE | 19615499 | 10/1997 |
| DE | 19617553 | 11/1997 |
| DE | 19622383 | 12/1997 |
| EP | 0696724 | 2/1996 |
| JP | 7-286868 | * 10/1995 |
| JP | 8-327412 | * 12/1996 |
| JP | 2000-28402 | * 1/2000 |

* cited by examiner

Primary Examiner—Diego Gutierrez
Assistant Examiner—Yautza Guadalupe
(74) Attorney, Agent, or Firm—Martin A. Farber

(57) ABSTRACT

In a pointer-type instrument (1) having a pointer with a pointer shaft (5) that deflects a pointer vane (2), power is supplied to a light source (3), which is connected to the pointer for rotation in common, by a flexible, spiral film (11) provided with conductor tracks (12, 13). For this purpose, the pointer shaft (5) has an enlargement (9), which supports the film (11) and secures it against sliding off axially. As a result, the film (11) can be made particularly thin, thereby making it possible to reduce the driving torque required to deflect the pointer shaft (5).

9 Claims, 2 Drawing Sheets

POINTER INSTRUMENT

FIELD AND BACKGROUND OF THE INVENTION

The invention relates to a pointer-type instrument, in particular for a motor vehicle, having a pointer with a pointer shaft that deflects a pointer vane and having a light source connected to the pointer for rotation in common, the light source being connected to a power supply by means of a flexible film provided with conductor tracks.

A pointer instrument of this kind, in which, in addition, the light source is arranged in an upper portion of the pointer shaft and shines light directly into the pointer vane, is widely used especially in the automotive industry today and is thus part of the prior part. In this arrangement, a film with printed-on conductor tracks is connected at one end to a circuit board and at its other end to contact locations on the shaft, where it forms a loop.

Here, there is a disadvantageous effect due to the fact that, when the pointer is deflected, the loop formed by the film jumps each time there is a reversal in the movement of the pointer, owing to the large angle of pointer rotation required and the intrinsic stiffness of the film. This results in torque jumps, which lead to inaccuracy of the display. Moreover, the characteristic of the restoring torque of a pointer-type instrument of this kind is nonuniform, further impairing its accuracy of indication. The pointer drive must therefore produce a high driving torque to enable the torques produced by the film to be absorbed and to ensure accurate indication.

These abovementioned disadvantageous effects due to the spring action of the film could be reduced by making the film as long and thin as possible. In practice, however, this has the effect that the film slides off axially relative to the pointer shaft due to its low dimensional stability and thereby impairs the operation of the pointer-type instrument.

SUMMARY OF THE INVENTION

The problem underlying the invention is to provide a pointer-type instrument of the type stated at the outset such that the driving torque required to deflect the pointer shaft is significantly lower in comparison with known pointer-type instruments. At the same time, fluctuations in the restoring torque should to a large extent be avoided.

According to the invention, this problem is solved in that the film can be wound in a spiral onto the pointer shaft, and that the pointer shaft has a flange-like enlargement, which extends in an essentially radial direction away from the pointer shaft, against which the film can be placed by one of its lateral edges and the outside diameter of which is at least as great as the wound-on diameter of the film.

The flange-like enlargement of the pointer shaft prevents the film from sliding off axially in an effective manner by supporting the film. This allows the film to be made considerably thinner in comparison with known pointer-type instruments, and this is associated with a reduction in the restoring forces. The driving torque required to drive the pointer shaft is thus considerably reduced. It is furthermore possible to reduce the number of turns required to give a uniform resistance torque characteristic, and the total length of the film and hence production costs are thus lower.

If, according to an advantageous development of the invention, the pointer vane is a light guide that can be illuminated, and light emitted by the light source can be coupled into the pointer vane, the pointer-type instrument can be read particularly easily, especially in the dark.

It is also advantageous if the light source is arranged on the pointer vane and light can be emitted in the direction of a viewer by the light source. In this context, the pointer vane can be designed as a simple web, on which the light source is mounted. To increase luminosity and improve the readability of the pointer, a plurality of light sources arranged adjacent to one another in the longitudinal direction of the pointer vane can be provided.

A particularly clearly divided and comprehensible pointer-type instrument is obtained if, according to another advantageous development of the invention, a dial, at least partial areas of which can be transilluminated, is arranged in front of that side of the pointer which faces a viewer. From the point of view of the viewer, the pointer is here arranged behind the dial but can be seen through those areas of the dial that can be transilluminated. Visibility is particularly good if the pointer is actively illuminated by means of the light source.

A particularly advantageous embodiment of the invention is obtained if the flange-like enlargement is embodied as a circular disk. Such a rotationally symmetrical embodiment of the enlargement ensures that the film is wound on uniformly and hence in a manner that reduces stress on the film with its conductor tracks. It is thereby possible to further reduce the susceptibility of the pointer-type instrument thus. equipped to faults.

In a particularly advantageous development of the invention, the flange-like enlargement has an oblique surface which falls away outward. By means of this oblique surface in the form of a kind of ramp, it is possible to considerably simplify the wind-on process during the rotary motion of the pointer shaft. In this case, it is possible to increase the tolerances between the film and the enlargement without the simultaneous risk that the film will be wound on nonuniformly or will slip off over the edge of the enlargement.

Another, particularly advantageous embodiment of the invention is obtained if, in addition to the first enlargement, the pointer shaft has a second enlargement and the film is arranged between the enlargements. This makes it possible to achieve a further improvement in guidance, thus excluding the possibility that the film will slip off at the top and, in association with this, strike against other components of the pointer-type instrument under the influence of external forces, e.g. vehicle movements.

Another, particularly advantageous development of the invention is obtained if in an end region remote from the pointer shaft, the film has a portion which is thicker than in a central region, which can be wound up. A film thickness of approximately 75 μm in its central wind-on region and of approximately 300 μm in its end regions is advantageous, for example, thereby achieving a higher mechanical robustness in the latter regions. By stiffening the film in this way, it is possible to achieve dimensional stability in that portion which is not wound up during the rotary motion of the pointer shaft. Moreover, there is no tendency for the film to sag outside those areas which are supported by the enlargement. There is therefore no need for further guide means.

In this context, a particularly advantageous development of the invention is obtained if the light source is a light-emitting diode that is brought into contact with the film. A unit of this kind, which has already been preassembled, comprising the film and the illumination means embodied as a light-emitting diode, significantly reduces the outlay on assembly. In this case, contact-making errors during assembly are virtually eliminated.

BRIEF DESCRIPTION OF THE DRAWINGS

The invention admits of various embodiments. To illustrate its basic principle further, two of these are illustrated in the figures of the drawing and described below. In the drawing.

DETAILED DESCRIPTION OF THE PREFERRED EMBODIMENT

Figure 1:
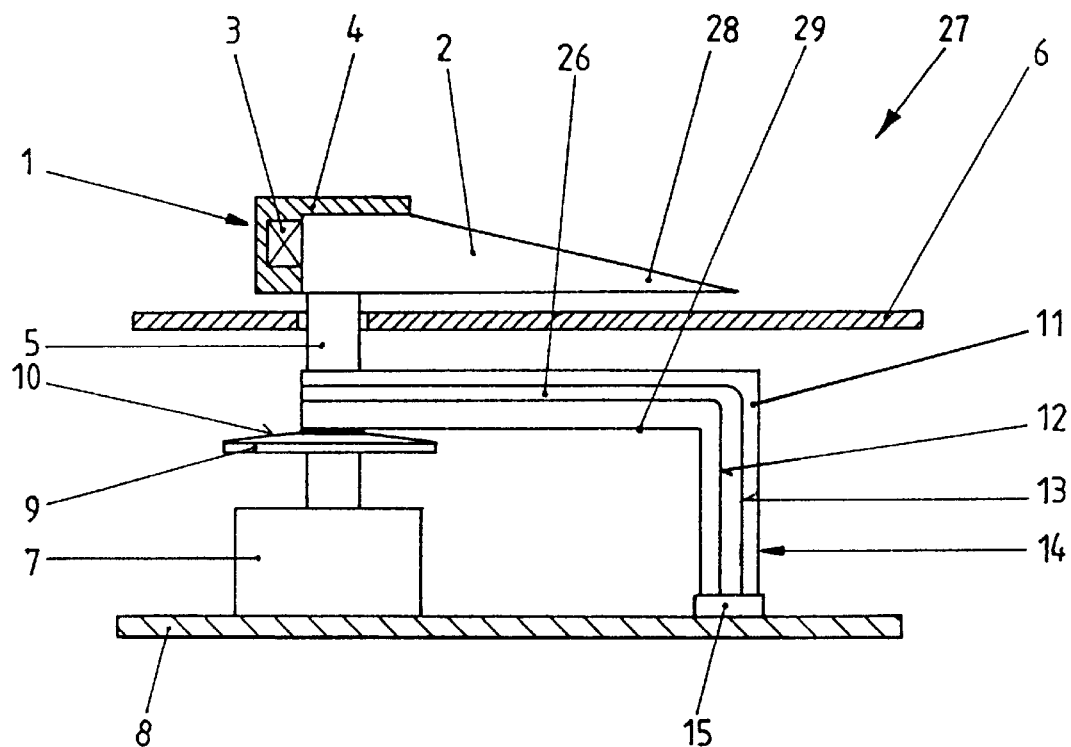
FIG. 1 shows a lateral, partially sectioned representation of a pointer-type instrument according to the inventions.

FIG. 1 gives a simplified representation of a pointer-type instrument 27 with a pointer 1 having a pointer vane 2. Shining into this pointer vane 2 is a light source 3, which is provided as a light-emitting diode and is shielded from a possible viewer by a cap 4. At its end opposite a pointer tip 28, the pointer vane 2 is connected on the underside to a pointer shaft 5, which is passed through a dial 6 and can be deflected by means of a pointer drive 7 embodied as a measurement mechanism. Between a circuit board 8 carrying the pointer drive 7 and the dial 6, the pointer shaft 5 has a flange-like enlargement 9, which has an oblique surface 10 that falls away outward. Resting against the enlargement 9 is part of a wind-on central region 26 of a film 11, which is wound around the pointer shaft 5 in a spiral and has a lower lateral edge 29. The film 11, which is provided with two conductor tracks 12, 13 for connecting the light source 3 to an energy supply, is passed to the outside approximately at right angles to the pointer shaft 5 and, in its end region remote from the pointer shaft 5, has a thickened portion 14, which points downward. This thickened portion 14 has a plug-in connector 15, by means of which the film 11 is connected to the circuit board 8 forming the power supply. The integral connection of the film 11 to the light-emitting means 3, said connection running along a recess in the pointer shaft 5, is not shown.

Figure 3:
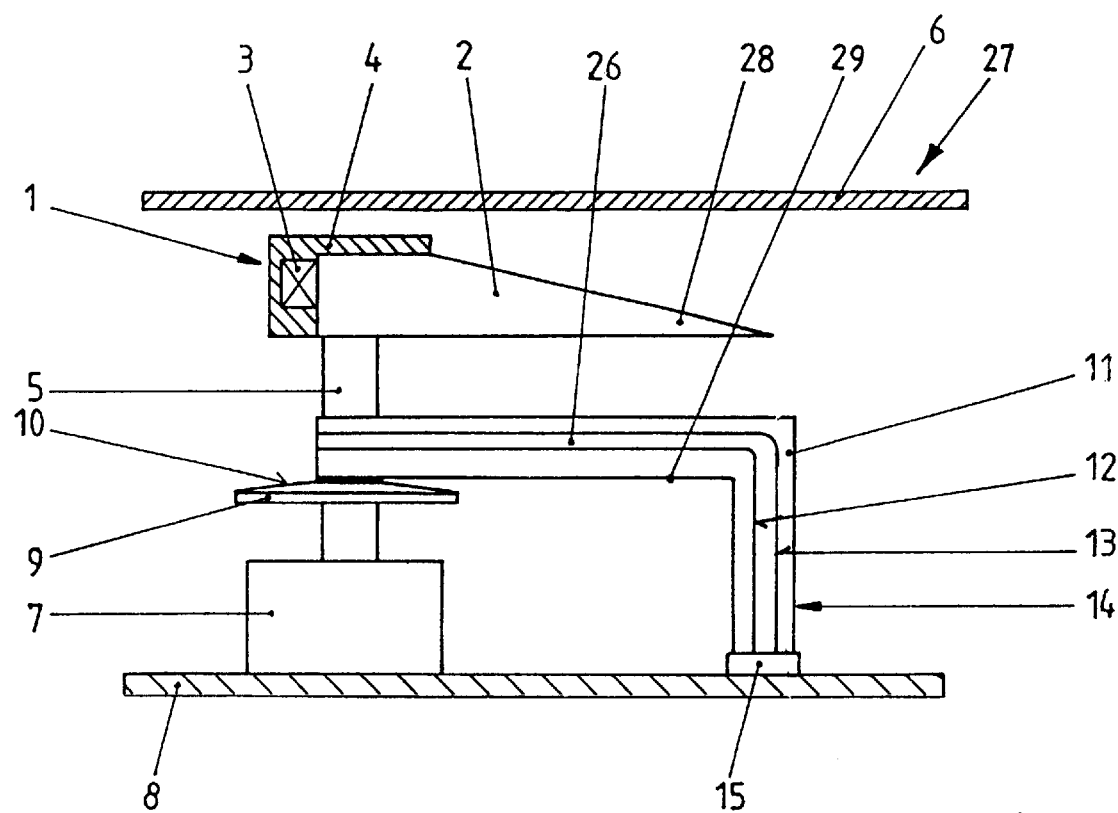
FIG. 3 shows the dial being in front of the pointer of the pointer-type instrument of the present invention.

FIG. 3 shows the pointer-type instrument of the present invention as depicted in FIG. 1 with the dial being in front of the pointer.

Figure 2:
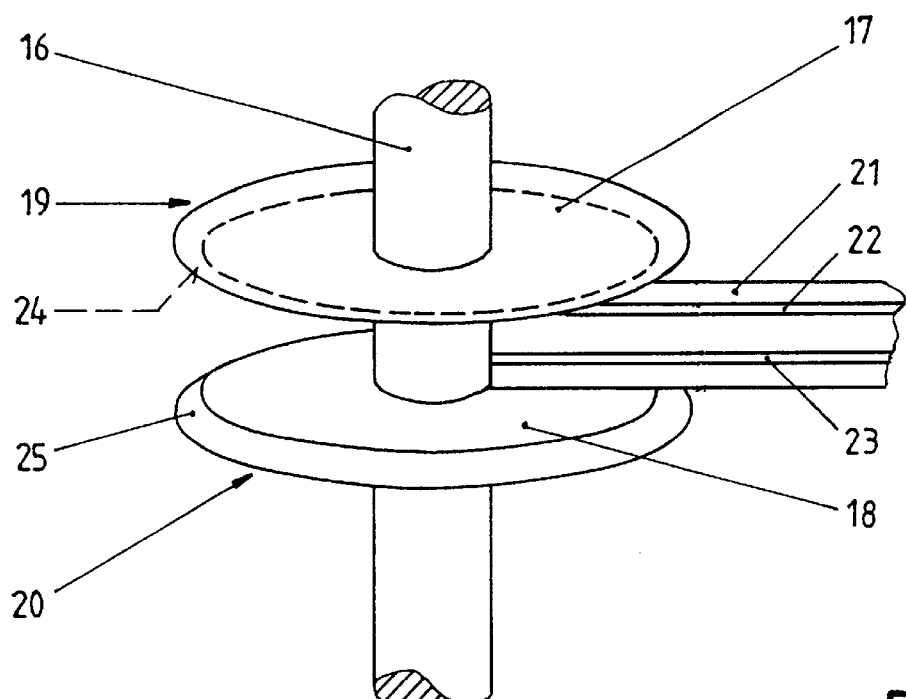
FIG. 2 shows part of a pointer shaft of another pointer-type instrument according to the invention with two enlargements.

FIG. 2 shows a perspective representation of part of a pointer shaft 16 in an embodiment which has been modified in comparison with the pointer shaft illustrated in FIG. 1. Here, the pointer shaft 16 has two enlargements 19, 20 arranged mirror-image fashion and each embodied as a circular disk 17, 18. These enlargements enclose a film 21, likewise shown only in part, with two conductor tracks 22, 23, the film having been completely unwound in the position illustrated. If the light source (not shown here) is, for example, a color-changing light-emitting diode, the color of which is changed when a limiting value is reached, for example, more than two conductor tracks may be necessary. To allow better guidance of the film 21, the two circular disks 17, 18 each have an oblique surface 24, 25 which falls away outward.

We claim:

1. A pointer instrument comprising a pointer with a pointer shaft, said shaft being rotatable relative to a stationary part of the instrument for deflecting a pointer vane of the pointer, a light source connected to the pointer for rotation in common, the light source being connected to a power supply by a flexible film provided with conductor tracks, wherein the film (11, 21) is windable in a spiral onto the pointer shaft (5, 16), and wherein the pointer shaft (5, 16) has a flange-like enlargement (9, 19, 20) for guiding the film, said enlargement extending in an essentially radial direction away from the pointer shaft (5, 16), said film being windable on said shaft between the enlargement and the pointer and placeable against the enlargement by one of its lateral edges, the enlargement having an outside diameter which is at least as great as the wound-on diameter of the film (11, 21), wherein in an end region of said film remote from the pointer shaft (5, 16), the film (11, 21) has an upstanding portion (14) extending from said stationary part, which upstanding portion is thicker than said film in a central region (26), which central region is windable on said pointer shaft.

2. The pointer instrument as claimed in claim 1, wherein the pointer vane (2) is a light guide that is illuminable, and wherein light emitted by the light source (3) is couplable into the pointer vane (2).

3. The pointer instrument as claimed in claim 1, wherein the light source is arranged on the pointer vane, and wherein light is emittable by the light source in a direction of a viewer.

4. The pointer instrument as claimed in claim 1, wherein a dial, at least partial areas of said dial being transilluminable, is arranged in front of a side of the pointer which faces a viewer.

5. The pointer instrument as claimed in claim 1, wherein the flange-like enlargement (9, 19, 20) is a circular disk (17, 18).

6. The pointer instrument as claimed in claim 1, wherein the flange-like enlargement (9, 19, 20) has a first non-beveled region surrounding the pointer shaft and a second beveled region around a periphery of said first region.

7. The pointer instrument as claimed in claim 1, wherein, in addition to the first-mentioned enlargement (19, 20), the pointer shaft (5, 16) has a second enlargement (19, 20), and wherein the film (21) is arranged between said enlargements (19, 20).

8. The pointer instrument as claimed in claim 1, wherein the light source (3) is a light-emitting diode, said light-emitting diode being in contact with the film (11, 21).

9. A pointer instrument for a motor vehicle comprising a pointer with a pointer shaft, said shaft deflecting a pointer vane of the pointer, a light source connected to the pointer for rotation in common with the pointer, the light source being connected to a power supply by a flexible film provided with conductor tracks, wherein the film (11,21) is windable in a spiral onto the pointer shaft (5,16), and wherein the pointer shaft (5,16) has a flange-like enlargement (9, 19, 20) for guiding the film, said enlargement extending in an essentially radial direction away from the pointer shaft (5, 16), said film being windable on said shaft between the enlargement and the pointer and placeable against the enlargement by a lateral edge of the film, the enlargement having an outside diameter which is at least as great as the wound-on diameter of the film (11, 21), wherein in an end region of said film remote from the pointer shaft (5, 16), the film (11, 21) has an upstanding portion (14) extending from said stationary part, which upstanding portion is thicker than said film in a central region (26) of the film, which central region of the film is windable on said pointer shaft.

* * * * *